(12) United States Patent
Komori et al.

(10) Patent No.: US 7,452,629 B2
(45) Date of Patent: Nov. 18, 2008

(54) NICKEL METAL HYDRIDE STORAGE BATTERY

(75) Inventors: Katsunori Komori, Toyohashi (JP);
Yoshiaki Ogata, Toyohashi (JP);
Atsushi Adachi, Kosai (JP); Katsunori Maekawa, Kosai (JP); Noriyuki Fujioka, Kosai (JP)

(73) Assignees: Panasonic Corporation, Osaka (JP);
Toyota Jidosha Kabushiki Kaisha, Aichi (JP)

( * ) Notice: Subject to any disclaimer, the term of this patent is extended or adjusted under 35 U.S.C. 154(b) by 166 days.

(21) Appl. No.: 10/798,149

(22) Filed: Mar. 10, 2004

(65) Prior Publication Data

US 2004/0191619 A1    Sep. 30, 2004

(30) Foreign Application Priority Data

Mar. 14, 2003    (JP)    ............................. 2003-070776

(51) Int. Cl.
*H01M 2/02*    (2006.01)
*H01M 2/04*    (2006.01)
*H01M 2/00*    (2006.01)

(52) U.S. Cl. .................. 429/176; 429/163; 429/166; 429/168; 429/167; 429/177

(58) Field of Classification Search .............. None
See application file for complete search history.

(56) References Cited

U.S. PATENT DOCUMENTS 4,892,793 A * 1/1990 von Benda et al. ............ 429/60
5,747,186 A * 5/1998 Morishita et al. ............. 429/53
5,780,180 A * 7/1998 Okamoto et al. ............ 429/175
6,528,202 B1 * 3/2003 Arai et al. ...................... 429/54
6,939,642 B2 * 9/2005 Asahina et al. ............. 429/161
2004/0137320 A1 * 7/2004 Komori et al. .............. 429/176

FOREIGN PATENT DOCUMENTS

| JP | 5-21045 | | 1/1993 |
| JP | 05021045 A | * | 1/1993 |
| JP | 5-283059 | | 10/1993 |
| JP | 05283059 A | * | 10/1993 |
| JP | 9-259840 | | 10/1997 |
| JP | 09259840 | * | 10/1997 |
| JP | 10-106513 | * | 4/1998 |
| JP | 3049854 | | 3/2000 |
| JP | 2004-22455 | | 1/2001 |
| JP | 2002-329483 | | 11/2002 |
| JP | 2004-22454 | | 1/2004 |
| JP | 2004022454 | * | 1/2004 |

* cited by examiner

*Primary Examiner*—Patrick Ryan
*Assistant Examiner*—Angela J. Martin
(74) *Attorney, Agent, or Firm*—Hamre, Schumann, Mueller & Larson, P.C.

(57) ABSTRACT

A nickel metal hydride storage battery included a battery case, and a group of electrode plates arranged in the battery case, wherein the battery case includes a battery case main body having a hole and a lid for closing the hole. The battery case includes a first portion made of a metal or a laminate of a metal and a resin, and a second portion made of a resin; and an area of the first portion is 20% or more and 90% or less with respect to the entire battery case. Thus, a nickel metal hydride storage battery is capable of controlling the amount of hydrogen permeating the battery case and capable of suppressing the long-term deterioration.

13 Claims, 5 Drawing Sheets

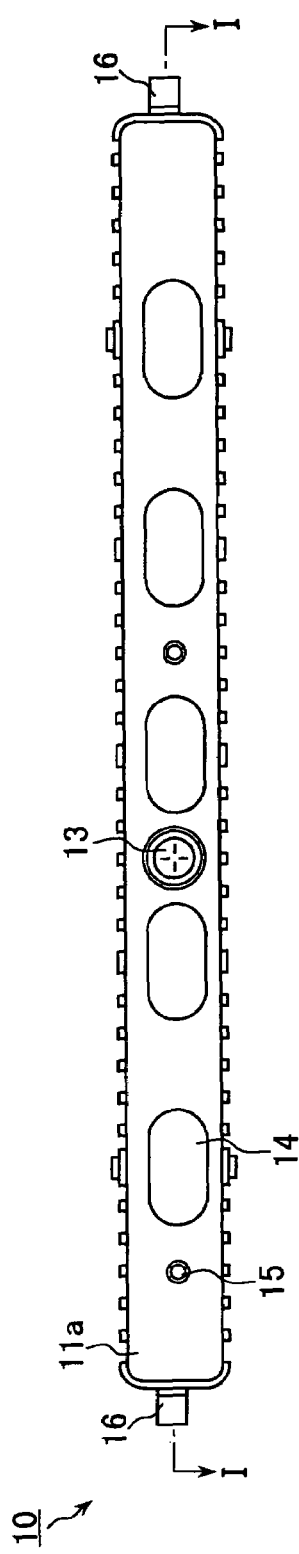
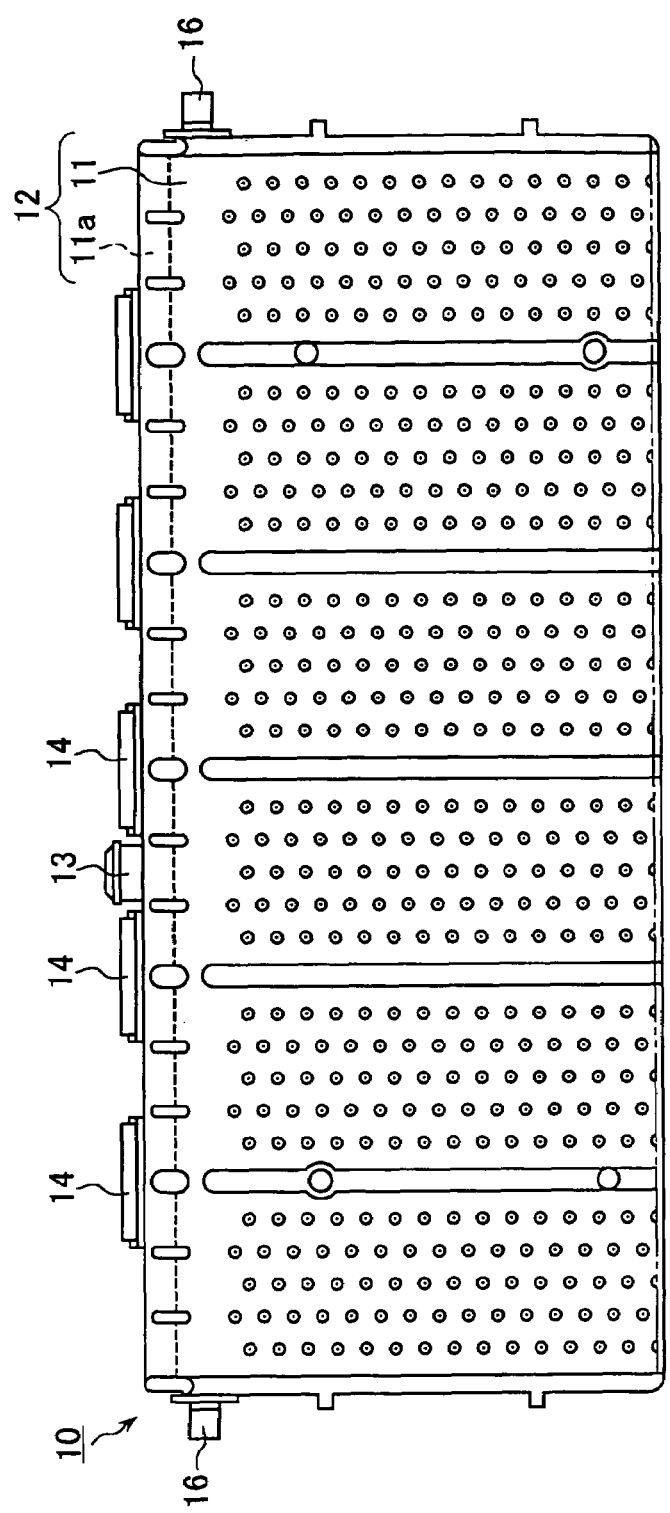
FIG.1A
FIG.1B

NICKEL METAL HYDRIDE STORAGE BATTERY

FIELD OF THE INVENTION

The present invention relates to nickel metal hydride storage batteries.

BACKGROUND OF THE INVENTION

For a battery case of an enclosed nickel metal hydride storage battery, a resin battery case or a metal battery case is used. Furthermore, a battery case whose surface is coated with a metal layer has been proposed (see, for example, Japanese Patent No. 3049854).

An enclosed nickel metal hydride storage battery is designed so that the capacity of the negative electrode is larger than the capacity of the positive electrode. Excess capacity that can be charged of the negative electrode is referred to as "discharge reserve," and excess capacity of the negative electrode that can be discharged is referred to as "discharge reserve." The discharge capacity of the battery is limited by the capacity of the positive electrode (positive electrode regulation). By making the negative electrode capacity be larger than the positive electrode capacity, it is possible to suppress the increase in the internal pressure at the time of overcharging and overdischarging.

In a nickel metal hydride storage battery using a resin battery case, a small amount of hydrogen continues to leak out through the battery case. If hydrogen leaks out from the battery, the discharge reserve at the negative electrode is decreased in accordance with the amount of leaked hydrogen. Therefore, in the nickel metal hydride storage battery that was used for a long time, the capacity balance between the positive electrode and the negative electrode is lost and the negative electrode capacity is decreased. As a result, the discharge capacity may be decreased or oxygen may be generated from the negative electrode at the time of overdischarging. Thus, it is thought that in such a nickel metal hydride storage battery using a resin battery case, a so-called long-term deterioration that appears when a small amount of hydrogen continues to leak out for a long time. Since hydrogen leaks out very slowly, it does not matter during a general using term. However, this deterioration may matter in batteries that are intended to be used for a long time, for example, batteries that are required to have 10 years or more of life.

On the other hand, in a metal battery case or a resin battery case coated with a metal layer, since hydrogen is not likely to permeate the battery case, the above-mentioned deterioration is not likely to occur. However, in the nickel metal hydride storage battery, regardless of materials of the battery case, a hydrogen-absorbing alloy at the negative electrode is corroded and a side reaction occurs in which the amount of hydrogen to be absorbed by the hydrogen-absorbing alloy is increased. As a result, the discharge reserve at the negative electrode is increased while the charge reserve at the negative electrode is decreased and thus the internal pressure of the battery is increased easily at the time of charging. When the charge reserve continues to be decreased due to a long period of use, the internal pressure of the battery becomes too high at the time of full charging and the safety valve operates. As a result, gas or electrolyte inside the battery is released, which may deteriorate the property of the battery. Thus, it is thought that in the nickel metal hydride storage battery, regardless of materials of the battery case, long-term deterioration may occur due to the corrosion of the hydrogen absorbing alloy after it is used for a long time.

SUMMARY OF THE INVENTION

It is an object of the present invention to provide a nickel metal hydride storage battery capable of suppressing the long-term deterioration by controlling the amount of hydrogen permeating a battery case.

The storage battery of the present invention includes a battery case; and a group of electrode plates arranged in the battery case. The battery case includes a battery case main body having a hole and a lid for closing the hole; the battery case includes a first portion made of a metal or a laminate of a metal and a resin, and a second portion made of a resin; and an area of the first portion is 20% or more and 90% or less with respect to the entire battery case. Herein, an area of the entire battery case, an area of the first part and an area of the second part denote an area associated with the leakage of hydrogen inside the battery case and do not include an area that increases by convex/concave portions formed on the surface thereof The area herein is an area that is approximated to a smooth surface.

BRIEF DESCRIPTION OF THE DRAWINGS

FIG. 1A is a top plan view showing an example of a nickel metal hydride storage battery according to the present invention, and FIG. 1B is a side view thereof

DETAILED DESCRIPTION OF THE INVENTION

In the nickel metal hydride storage battery, the battery case main body may include a resin case and a multilayered film formed on a part of the surface of the resin case. The multilayered film includes a metal layer and two resin layers arranged in a manner in which the metal layer is interposed between the two resin layers; and a portion on which the multilayered film may be formed is the first part.

In the nickel metal hydride storage battery, the average thickness of the second portion may be 0.7 mm or more and 2.5 mm or less. The hydrogen permeability coefficient at 40° C. of the resin forming the second portion is $2\times10^{-15}$ mol·m/m$^2$·sec·Pa or more and $1\times10^{-14}$ mol·m/m$^2$·sec·Pa or less. Note here that the values of the hydrogen permeability coefficient and hydrogen permeability described herein are values measured at the temperature of 40° C. based on the method defined in JIS-K7126A (differential pressure method).

Hereinafter, JIS-K7126A (differential pressure method) of Japanese Industrial Standards will be explained.

Figure 5:
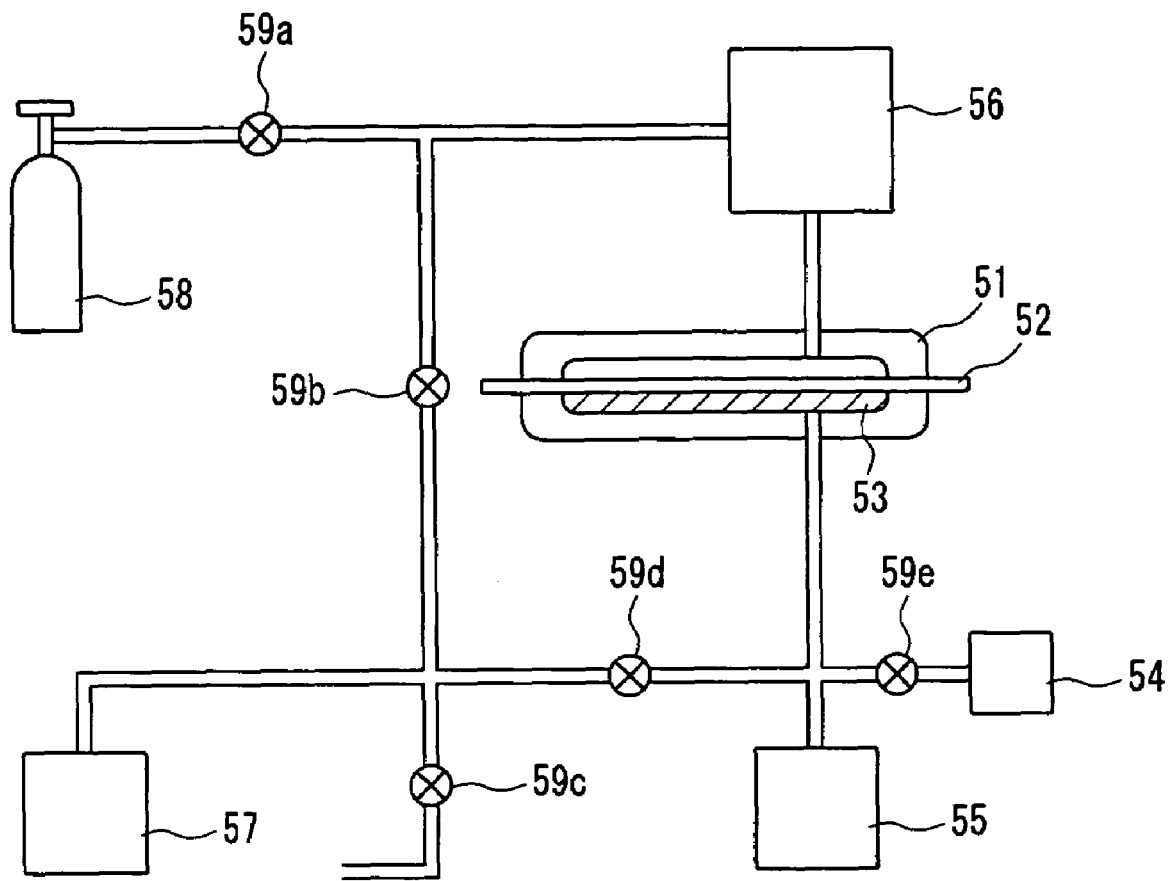
FIG. 5 is a view showing a method for measuring the gas permeability of layers that form a multilayered film used for the battery case main body of the nickel metal hydride storage battery of the present invention.

(1) An example of an apparatus for measuring the gas permeability is shown in FIG. 5.

This apparatus includes a permeation cell 51, a test piece 52, a filter paper 53, a variable cell volume unit 54, a pressure detector 55 for detecting the change in pressure by the permeated gas, a gas supplier 56 for supplying gas to the permeation cell 51, a vacuum pump 57, a test gas reservoir cylinder 58 and stop valves 59a to 59e.

(1-1) Permeation Cell

A permeation cell includes an upper part and a lower part, and when a test piece is attached thereto, the permeation area must be constant. The upper cell has an inlet port of a test gas and the lower cell is connected to the pressure detector. A surface on which the test piece is attached must be flat and smooth to avoid leakage. The diameter of the permeation surface is set to be 10-150 mm.

(1-2) Pressure Detector

A pressure detector can measure the change in the pressure at lower pressure side with high accuracy of 5 Pa (0.04 mmHg) or less. For detecting pressure, a vacuum gauge using mercury and other manometers, separate type electron sensors and the like are used. When the pressure detector using mercury is used, mercury can be used up to three times if distillation is carried out. However, in this case, it is necessary to check it for contamination constantly and to replace with new one if necessary.

(1-3) Test Gas Supplier

A test gas supplier is a tank in which test gas is stored, from which gas is supplied to the cell at the higher pressure side. In order to measure the pressure inside the tank, the tank needs to have a pressure gauge having accuracy of 100 Pa (0.75 mmHg) or less. It needs capacity such that the pressure at the higher pressure side can be prevented from reducing due to permeation.

(1-4) Variable Cell Volume Unit

In order to broaden the range for measuring the permeability, a variable cell volume unit such as a quantity-increasing tank, a cell adaptor, or the like may be used for adjusting the volume at the lower pressure side.

(1-5) Test Gas

It is desirable to use test gas having a purity specified by JIS, however, other gases may be used in accordance with the agreement between the interested parties.

(1-6) Vacuum Pump

A vacuum pump capable of exhausting the inside the measurement system to the pressure of 10 Pa (0.08 mmHg) or less is used.

(2) Operation (2-1) A paper filter having the same area as the permeation area is placed on the lower cell.

(2-2) A thin coating of vacuum grease is applied uniformly to the surface on which a test piece is attached and the test piece is placed thereon in a manner in which it is not wrinkled nor loose.

(2-3) A packing is set on the test piece and fixed thereon so that no leakage of gas occurs by applying uniform pressure.

(2-4) The vacuum pump is operated to exhaust firstly the lower pressure side and then the higher pressure side. Cares should be taken since the exhausting time is different depending on the kinds and the method for adjusting the states of the test piece.

(2-5) Exhaustion is stopped at the lower pressure side so as to keep vacuum.

(2-6) If there is fluctuation in the pressure at the lower pressure side, air leakage or degassing may occur. In this case, operations (2-4) and (2-5) are repeated.

(2-7) About one atmospheric pressure of the test gas is introduced into the higher pressure side. The pressure ($P_u$) at the higher pressure side at this time is recorded. The pressure at the lower pressure side starts to increase and the permeability is confirmed.

(2-8) A permeation curve is drawn and measurement is continued until a line segment showing the stationary status of the permeability is confirmed.

(2-9) From a slope of the line segment of the permeation curve, ($d_p/d_t$) is determined. For the permeation curve, an automatically recorded permeation curve may be used.

(3) Calculation

The gas permeability and gas permeability coefficient are calculated by the following equations (3-1) to (3-4).

(3-1) Gas Permeability $$GTR=[V_c/(R \times T \times P_u \times A)] \times (d_p/d_t)$$

In this equation,
GTR: gas permeability (mol/m²·s·Pa)
$V_c$: volume at lower pressure side (l)
T: test temperature (K)
Pu: differential pressure of supplied gas (Pa)
A: permeation area (m²)
$d_p/d_t$: change in pressure (Pa) at lower pressure side per unit time (s)
R: $8.31 \times 10^3$ (l·Pa/K·mol).

(3-2) Gas permeability coefficient $$P=GTR \times d$$

In the equation,
P: gas permeability coefficient (mol·m/m²·sec·Pa)
GTR: gas permeability (mol/m²·sec·Pa)
d: thickness of test piece (m).

In the above-mentioned nickel metal hydride storage battery, the group of electrode plates may include a negative electrode including a hydrogen absorbing alloy as a main component and the equilibrium hydrogen desorption pressure of the hydrogen absorbing alloy at 45° C. may be 0.02 MPa or more and 0.1 MPa or less.

In the above-mentioned nickel metal hydride storage battery, the second portion is made of a resin. In order to improve the mechanical strength, to this resin, filler such as a glass fiber, mica, etc. may be added. Particularly preferable resin is a polymer alloy of polypropylene and polyphenylene ether.

According to the present invention, it is possible to obtain a nickel metal hydride storage battery that is hardly deteriorated after a long period of use. The present invention is particularly suitable for batteries that are intended to be used for a long period, for example, used as batteries for a power supply of electric cars or hybrid cars.

Hereinafter, the present invention will be explained by way of embodiment. FIG. 1A shows a top plan view of a nickel metal hydride storage battery 10 (hereinafter, also referred to as a battery 10) that is one example of the battery of the present invention, and FIG. 1B is a side view thereof.

Figure 2:
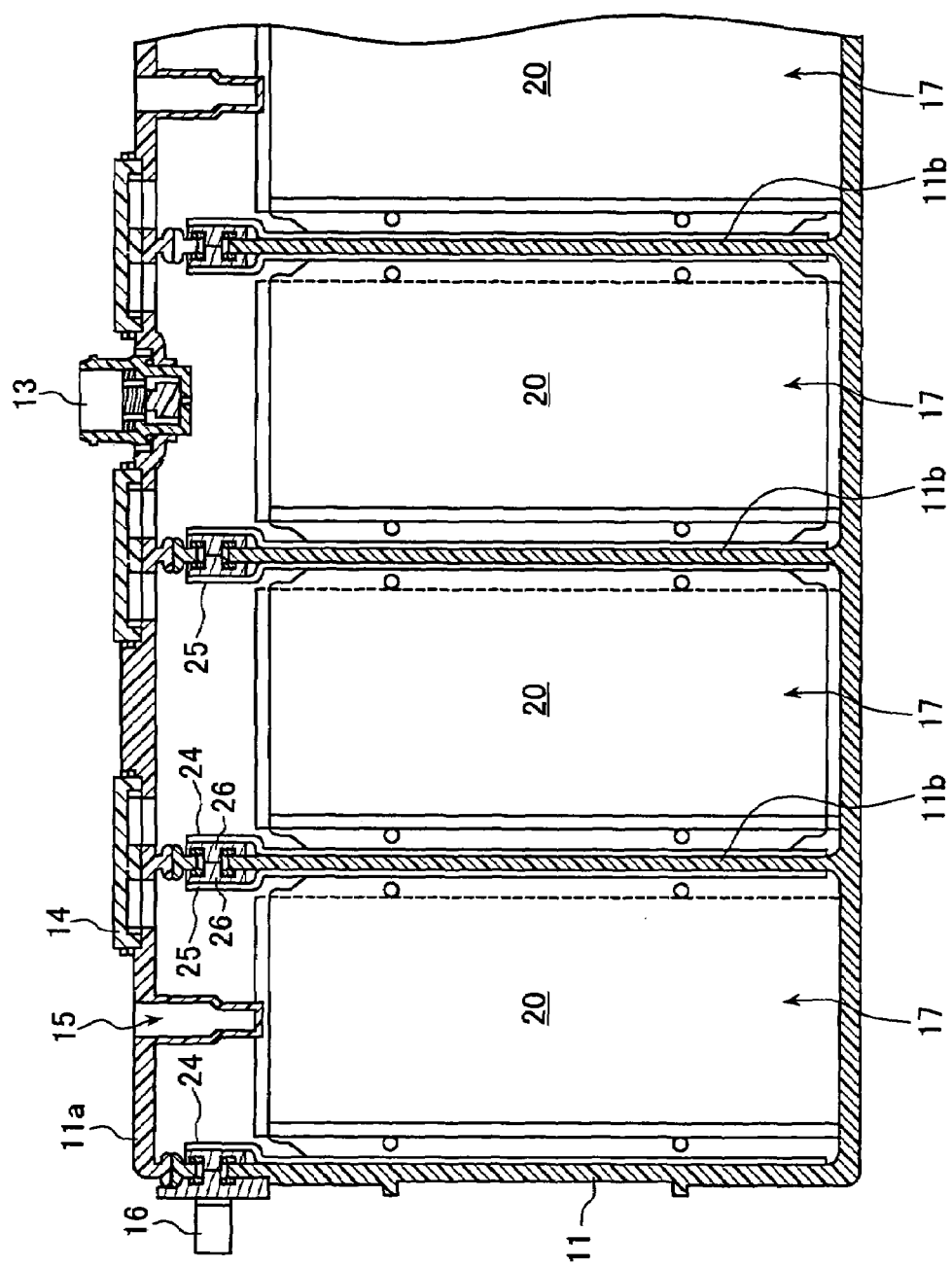
FIG. 2 is a cross-sectional view showing the nickel metal hydride storage battery shown in FIG. 1 taken on line I-I.

The battery 10 is provided with a battery case 12 including a group of electrode plates 20 arranged therein. The battery case 12 includes a battery case main body 11 having holes and a lid 11a enclosing the holes of the battery case main body 11. A safety valve 13, a lid 14 of a communication hole and a temperature sensor mounting hole 15 are arranged in the lid 11a. Two terminals 16 are provided in the battery case main body 11. The safety valve 13 opens when the internal pressure in the battery case 12 reaches a predetermined value or more, and the gas inside is released so as to reduce the internal pressure in the battery case 12. A plurality of protrusions are formed on the surface of the battery case main body 11 in order to improve the heat radiation property when a plurality of nickel metal hydride storage batteries 10 are arranged while being attached tightly to each other. FIG. 2 is a cross-sectional view taken on line I-I of FIG. 1A.

The inside of the battery case main body 11 is partitioned into six compartments by partitions 11b. A group of electrode plates 20 and electrolyte (not shown) are disposed in each compartment. The group of electrode plates 20 and the electrolyte constitute a cell 17. In other words, the nickel metal hydride storage battery 10 includes six cells 17. The lid 14 equalizes the internal pressures in the cells 17.

Figure 3:
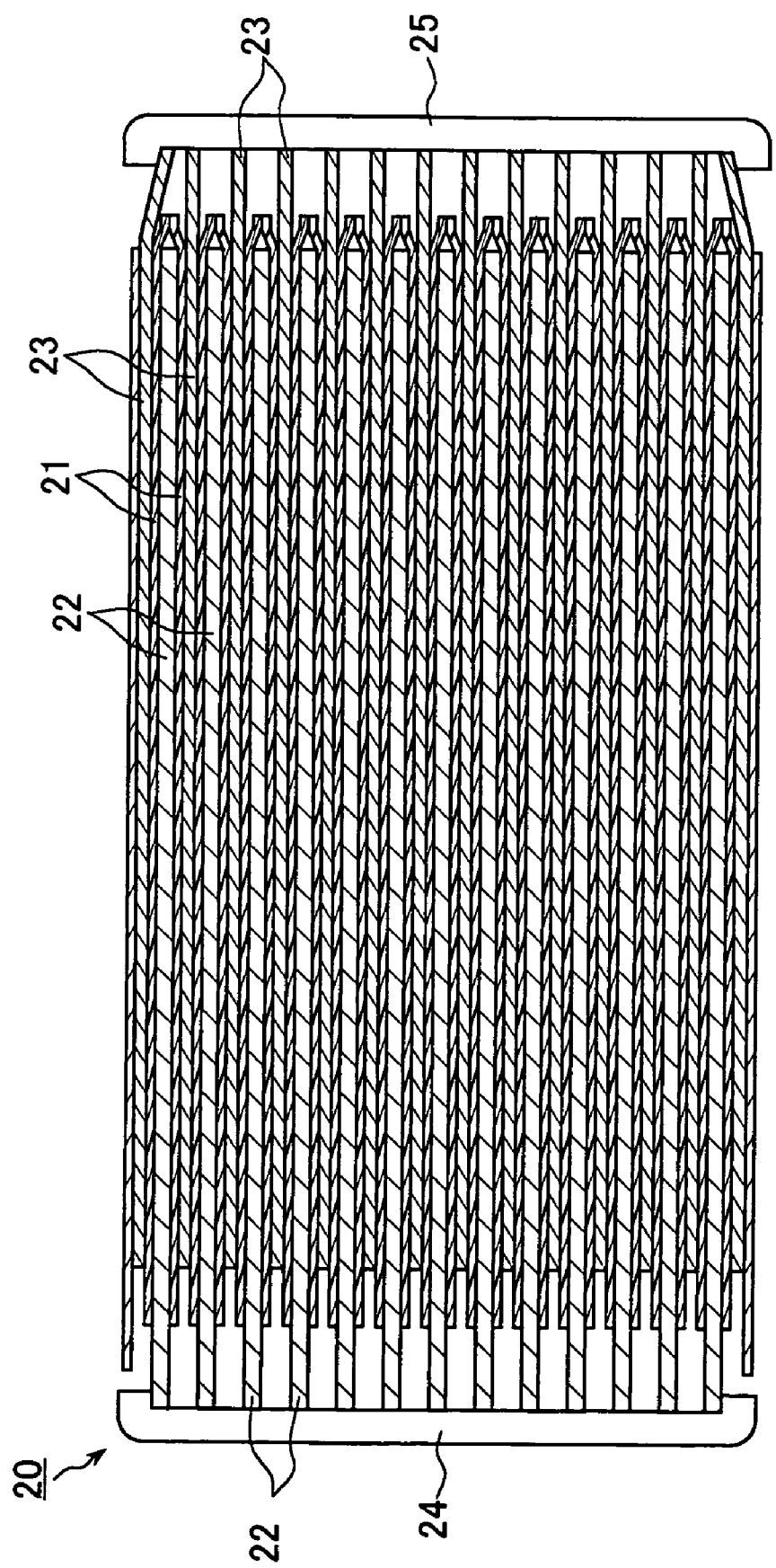
FIG. 3 shows a cross-sectional view showing a group of electrode plates of the nickel metal hydride storage battery shown in FIG. 1.

FIG. 3 is a cross-sectional view showing a group of electrode plates 20. The group of electrode plates 20 includes a separator 21, a positive plate 22 and a negative plate 23 that are laminated alternately with the separator 21 interposed therebetween, a collector 24 connected to the positive electrode plate 22 and a collector 25 connected to the negative electrode plate 23. As shown in FIG. 2, the collectors 24 and 25 are connected to the terminal 16 or a connection terminal 26. The collector 25 of the cell 17 is connected to the collector 24 of the adjacent cell 17 via the connection terminal 26. Thus, the cells 17 are connected in series.

For the group of electrode plates 20 and electrolyte, those generally used for nickel metal hydride storage batteries can be used. For an electrolyte, for example, an aqueous solution having a specific gravity of about 1.3 that contains potassium hydroxide as the main solute can be used. For the separator 21, for example, a polypropylene nonwoven fabric that was made to be hydrophilic can be used. The positive electrode plate 22 can be produced by applying a paste containing nickel hydroxide as an active material to a conductive support member so as to produce a sheet, and then drying, rolling and cutting this sheet.

On the other hand, the negative electrode plate 23 can be produced by applying a paste containing a hydrogen-absorbing alloy to a conductive support member so as to produce a sheet, and then drying, rolling and cutting this sheet. It is preferable that the hydrogen absorbing alloy used for the negative electrode 23 has an equilibrium hydrogen desorption pressure of 0.02 MPa or more and 0.1 MPa or less. By setting the value of the equilibrium hydrogen desorption pressure in this range, it is possible to avoid the deterioration of the discharging property due to the low equilibrium hydrogen desorption pressure and the deterioration of the charging property due to the high equilibrium hydrogen desorption pressure.

The following is an explanation of the battery case 12. The battery case 12 includes a first portion made of only a metal or a laminate of a metal and a resin, and a second portion made of only a resin. The area of the first portion is in the ratio of 20% or more and 90% or less (preferably, 40% or more and 80% or less, and more preferably in the range from 50% or more and 70% or less) with respect to the entire area of the battery case 12. The portion other than the first portion is a second portion except for only a portion such as a portion provided with a safety valve. That is to say, the battery case 12 substantially includes the first portion and the second portion.

Hydrogen is likely to permeate the second portion as compared with the first portion. It is preferable that the hydrogen permeability coefficient at 40° C. of the resin constituting the second portion is $2 \times 10^{-15}$ mol·m/m$^2$·sec·Pa or more and $1 \cdot 10^{-14}$ mol·m/m$^2$·sec·Pa or less. An example of the resin constituting the second portion includes a polypropylene (PP) single substance, a polymer alloy of polystyrene (PS) and polyphenylene ether (PPE), or a polymer alloy of polypropylene (PP) and polyphenylene ether (PPE). When the polymer alloy is used, it is possible to control the hydrogen permeability coefficient by changing the mixing ratio. The average thickness of the second portion is 0.7 mm or more and 2.5 mm or less. It is preferable that the average value of the hydrogen permeability at 40° C. of the second portion is $4 \times 10^{-18}$ mol/m$^2$·sec·Pa or more and $2.5 \times 10^{-17}$ mol/m$^2$·sec·Pa or less.

Since the first portion includes a metal layer, no hydrogen permeability is observed when tested in accordance with JIS K 7126 A method as mentioned above.

The battery case 12 including the first portion and the second portion can be achieved by various embodiments. Some of the examples are explained hereinafter.

A battery case main body 11 of the first embodiment includes a resin case and a multilayered film formed on a part of the surface of the resin case. The multilayered film includes two resin layers with a metal layer interposed therebetween. Such a battery case main body can be formed by inserting a multilayered film into a part of the resin case (for example, an entire longitudinal surface). A lid may be formed of a resin, or the multilayered film may be formed on a lid formed of a resin. A part of the battery cell 12 on which the multilayered film is formed is the first portion and a part in which the multilayered film is not formed is the second portion. Therefore, in the area of the entire battery case 12 including the lid, the area of the portion in which the multilayered film is formed is 20% or more and 90% or less. As an example, FIG. 4 is a partial cross-sectional view showing an example of a battery case main body having the outer surface of the resin case on which the multilayered film is formed.

Figure 4:
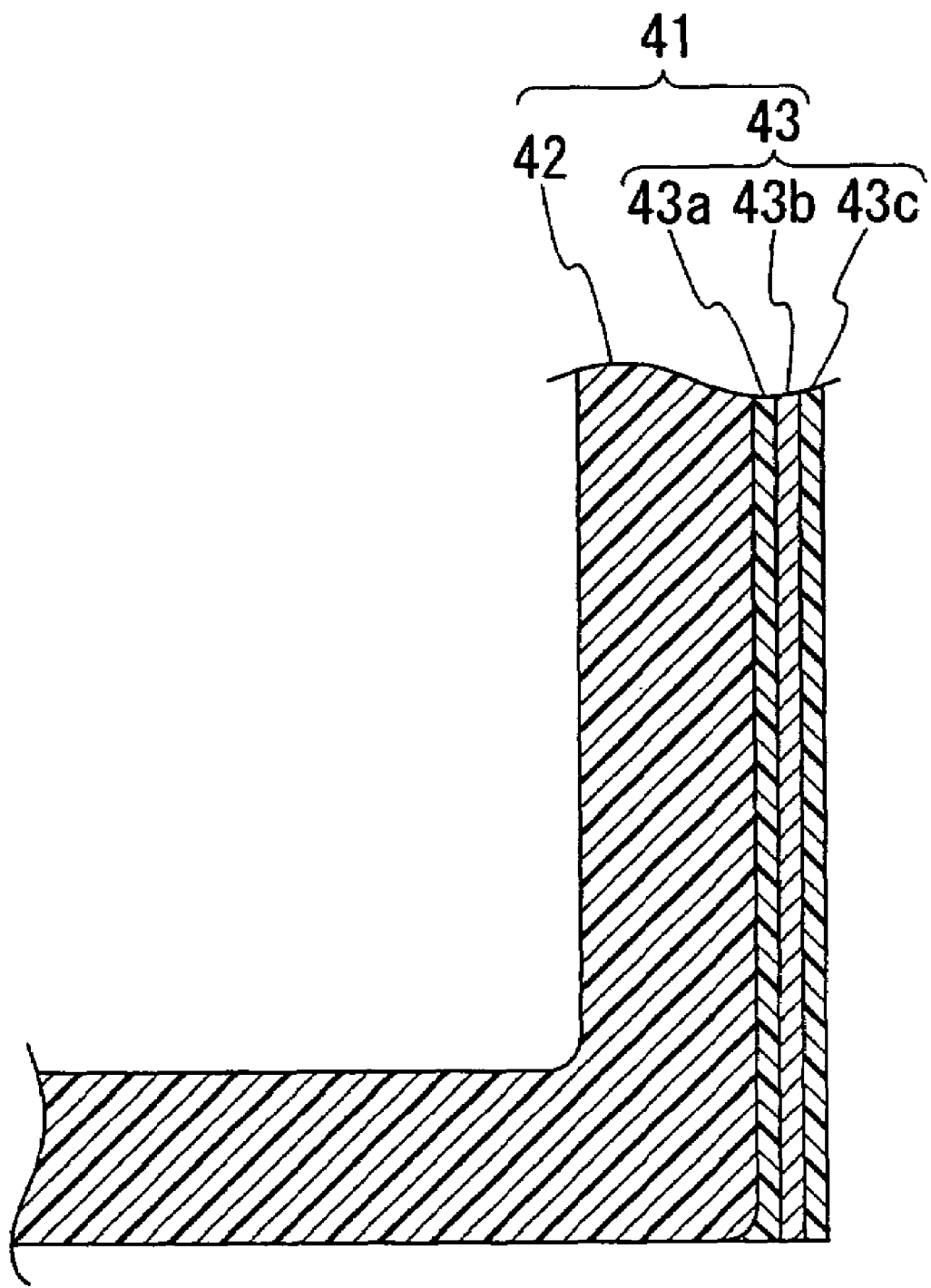
FIG. 4 is a partial cross-sectional view showing an example of the battery case main body of the nickel metal hydride storage battery of the present invention.

With reference to FIG. 4, the battery case main body 41 includes a resin case 42 and a multilayered film 43 formed on a part (for example, a longitudinal side surface) of the outer surface of the resin case 42. The resin case 42 is a case made of resin or a case containing a resin as a main component. As the thickness of the resin case 42 is increased, the strength is increased and gas permeability is lowered. However, the mass increases. Furthermore, as the thickness of the resin case 42 is increased, the heat radiation of the battery is deteriorated. Therefore, it is preferable that the average thickness of the resin case 42 is 0.7 mm or more and 2.5 mm or less.

The resin case 42 can be formed of a PP single substance or a polymer alloy of PP and PPE. The multilayered film 43 includes a metal foil 43*b* and resin layers 43*a* and 43*c* with the metal foil 43*b* interposed therebetween. As the metal foil 43*b*, for example, an Al foil can be used. It is preferable that the resin layer 43*a* includes the same resin as the resin constituting the resin case 42. The resin layers 43*a* and 43*b* can be formed by polypropylene (PP), etc. Note here that the multilayered film shown in FIG. 4 is one example and the present invention is not necessarily limited to this film and an other multilayer film can be used as long as it can achieve the object of the present invention.

In the second embodiment, an entire battery case is the first portion and the lid is the second portion. In this embodiment, the entire battery case main body is made of metal or the multilayered film 43 or metal film are formed on the entire resin case 42. When the battery case main body is made of metal, the battery case can be produced by, for example, a Ni-plating steel sheet.

It is preferable that the nickel metal hydride storage battery of the present invention is in an application that is intended to be used for a long time. For example, it is preferable that the battery of the present invention is used as a power supply for electric cars and hybrid cars. The capacity of the battery of the present invention in such an application is made to be about, for example, 4 Ah to 10 Ah. In the case of the rectangular battery used for such an application, the surface area that is calculated by approximating the battery to a rectangular parallelopiped, that is, a surface area per single unit calculated from the external size (length, width and height) of the battery is generally about 100 cm$^2$ to 300 cm$^2$.

When the nickel metal hydride storage battery using a resin battery case is used for a long time, since a small amount of hydrogen continues to leak out, the amount of the discharge reserve of the negative electrode is decreased. On the other hand, by the corrosion of the hydrogen absorption alloy at the negative electrode, the amount of the charge reserve is decreased. In the case of the battery case made of only a resin, the decrease in the amount of discharge reserve is significantly larger than the decrease in the amount of the charge reserve, and the capacity of the negative electrode is decreased. On the contrary, in the battery case made of only a metal, the decrease in the amount of charge reserve is significantly larger than the decrease in the amount of the discharge reserve, and the internal pressure of the battery is likely to be increased. On the other hand, the battery case of the nickel metal hydride storage battery includes a amount rate of the second portion in which hydrogen is likely to permeate.

Therefore, it is thought that the balance between the decrease in the amount of the discharge reserve due to the leakage of hydrogen and the decrease in the amount of the charge reserve due to the corrosion of the hydrogen absorbing alloy is not significantly altered. As a result, it is thought that according to the nickel metal hydride storage battery of the present invention, the deterioration of the properties after a long period of use can be suppressed.

Hereinafter, the present invention will be explained in more detail by way of Examples.

EXAMPLE 1

In Example 1, a plurality of nickel metal hydride storage batteries having different battery cases respectively were produced and the properties thereof were evaluated. First of all, the method for producing the respective batteries will be explained. Note here that the batteries in Example 1 were designed and produced so that the capacity of the positive electrode was 6.5 Ah and the capacity of the negative electrode was 10 Ah.

Comparative Sample 1

In the comparative sample 1, a conventional resin battery case was used. Specifically, a battery case (average thickness: 1.5 mm) made of a polymer alloy of PP and PPE and formed by injection molding was used. The hydrogen permeability coefficient of this polymer alloy was $4 \times 10^{-15}$ mol·m/m$^2$·sec·Pa.

For a separator, a sulfonated polypropylene non-woven fabric was used. For the positive electrode plate, a positive electrode plate containing nickel hydroxide was used; and for the negative electrode plate, a negative electrode plate containing a hydrogen-absorbing alloy was used. For an electrolyte, an alkaline aqueous solution having a specific gravity of about 1.3 that contains potassium hydroxide as a main solute was used. By using these members, the nickel metal hydride storage battery having a configuration shown in FIGS. 1 to 3 was produced as a comparative sample 1.

Comparative Sample 2

In the comparative sample 2, a battery case whose entire surface was coated with an Al-evaporation film was used. Specifically, a battery case obtained by depositing Al on the entire surface of the resin battery case used in the comparative sample 1 was used. The same battery (comparative sample 2) was produced as the battery of the comparative sample 1 except that the battery case was different.

Sample 1

In sample 1, a battery case was provided in which only a longitudinal side of the battery main body made of a resin (excluding a lid) was coated with an Al-evaporation film. For the battery case main body made of a resin, the same battery case main body as that used in the comparative sample 1 was used. An area coated with the Al-evaporation film was made to be 70% with respect to the entire area (a total area of the top face, a bottom face and a side face) of the battery case. The battery (sample 1) that was the same as the battery of the comparative sample 1 except that the battery case was different was produced.

Sample 2

In sample 2, a battery case in which Al laminated sheet was inserted and formed on a longitudinal side surface portion of the battery case main body (excluding a lid) made of a resin was used. For the laminate sheet, a sheet made of an Al foil (thickness: 50 µm) sandwiched by two PP layers (thickness: 20 µm) was used. An area of the portion on which a laminate sheet was formed was made to be 70% with respect to the entire area of the battery case. The same battery (sample 2) was produced as the battery of the comparative sample 1 except that the battery case was different.

Sample 3

In sample 3, a battery case in which a longitudinal side surface portion of the battery case main body (excluding a lid) made of resin was Ni-plated was used. An area of the Ni-plated portion was made to be 70%. The same battery (sample 3) was produced as the battery of the comparative sample 1 except that the battery case was different.

A plurality of the above-mentioned five kinds of samples were formed respectively. These batteries were charged so that the state of charge (SOC) was 80% and then stored in an atmosphere at 65° C. for 1 month to 3 months. Then, the amount of the discharge reserve of the negative electrode was measured before it was stored, stored for one month, two months, and three months, respectively.

The amount of the discharge reserve was measured by the following manner. First, the battery was discharged until the voltage of the battery reached 1.0 V. Then, a hole was provided on the upper portion of the battery and an electrolyte was refilled so that excessive electrolyte was present. Then, a Hg/HgO reference electrode was immersed in the electrolyte in the battery case. Then, the battery was overdischarged while the discharge capacity was measured. The amount of discharge reserve was defined by an equation: (the amount of discharge reserve)=(the discharge capacity up to the point when the potential difference of the negative electrode with respect to the reference electrode reaches −0.7 V)−(the discharge capacity up to the point when the potential difference of the positive electrode with respect to the reference electrode reaches −0.5 V). Table 1 shows the measurement results of the amount of discharge capacity.

TABLE 1

|  | Amount of discharge reserve [Ah] | | | |
| --- | --- | --- | --- | --- |
|  | Initial value | Stored for 1 month | Stored for 2 months | Stored for 3 months |
| Comparative sample 1 | 2.5 | 2.4 | 1.9 | 1.3 |
| Comparative sample 2 | 2.5 | 3.2 | 3.6 | 3.9 |
| Sample 1 | 2.5 | 2.8 | 2.8 | 2.7 |
| Sample 2 | 2.5 | 3.0 | 2.9 | 2.8 |
| Sample 3 | 2.5 | 2.8 | 2.6 | 2.4 |

As shown in Table 1, in the comparative sample 1, the discharge reserve was decreased and the deterioration mode proceeded, which may lead to the negative electrode regulation. In the comparative sample 2, the discharge reserve was increased, that is, the charge reserve was increased and the deterioration mode proceeded so as to open the safety valve. On the other hand, in the samples 1 to 3, the above-mentioned two deterioration modes did not proceed, thus enabling the deterioration to be suppressed.

EXAMPLE 2

In Example 2, a battery was produced by using a battery case formed by insert-molding a laminate sheet described with respect to the sample 2 to a part of the resin battery case, and then the property thereof was evaluated. For the resin battery cases, four kinds of battery cases each having different hydrogen permeability coefficient and average thickness were used. The battery case was made of a polymer alloy of PP and PPE, and by altering the mixing ratio of PP and PPE, the hydrogen permeability coefficient of the polymer alloy was made to be $2 \times 10^{-15}$ mol·m/m²·sec·Pa or $1 \times 10^{-14}$ mol·m/m²·sec·Pa. The areas of the portion for the laminate sheets to be formed were made to be 20%, 60% and 90%, respectively. Furthermore, as a comparative example, a battery case that was not coated with a laminate sheet was prepared. Note here that when the battery case was coated with a laminate sheet, insertion molding was carried out so that the area that coats the respective cells arranged in the battery case.

By using the above-mentioned battery case, the nickel metal hydride storage battery was produced by the same method as in the comparative sample 1. However, in Example 2, a hydrogen absorbing alloy having equilibrium hydrogen desorption pressure at 45° C. of 0.02 MPa or 0.1 MPa was used.

The thus obtained batteries were charged so that SOC became 80% and stored in the atmosphere of 65° C. for three months. Then, as to the stored batteries, the amount of discharge reserve of the negative electrode was measured by the same method as in Example 1. Table 2 shows the measurement results.

case where a metal layer is formed in a part of the surface of the battery case was explained. The same effect as that of the present invention can be obtained in the case of using a battery case including a battery case made of a metal and a hole enclosing plate made of only a resin was used. Furthermore, in the Examples, a rectangular shaped battery was described but the battery of the present invention is not limited to this alone.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A nickel metal hydride storage battery, comprising:
a battery case; and
a group of electrode plates arranged in the battery case, the electrode plates including a positive electrode plate comprising nickel hydroxide,

TABLE 2

| Hydrogen permeability coefficient at 40° C. of battery case resin [mol · m/m² · sec · Pa] | Average thickness of battery case [mm] | Equilibrium hydrogen desorption pressure of alloy [MPa] | Amount of discharge reserve after stored for 3 months [Ah] | | | |
|---|---|---|---|---|---|---|
| | | | Not coated | 20% coated | 60% coated | 90% coated |
| $1 \times 10^{-14}$ | 0.7 | 0.10 | — | — | −0.8 | 2.4 |
| | | 0.02 | 0.3 | 1.0 | 2.2 | 3.2 |
| | 2.5 | 0.10 | −0.2 | 0.5 | 2.0 | 3.1 |
| | | 0.02 | 2.4 | 2.6 | 3.1 | 3.4 |
| $2 \times 10^{-15}$ | 0.7 | 0.10 | −0.3 | 0.5 | 2.0 | 3.1 |
| | | 0.02 | 2.4 | 2.6 | 3.1 | 3.4 |
| | 2.5 | 0.10 | 2.2 | 2.5 | 3.0 | 3.4 |
| | | 0.02 | 3.1 | 3.2 | 3.4 | 3.5 |

Note here that the amount of discharge reserve in Table 2 was calculated from the equation defined in Example 1. Batteries whose amount of discharge reserve in Table 2 is shown by a minus value are batteries of negative electrode regulation. The amount of discharge reserve was 2.5 Ah.

The amount of hydrogen permeating the battery case is changed depending upon the hydrogen permeability coefficient of a resin constituting the battery case, thickness of the battery case, equilibrium hydrogen desorption pressure of the hydrogen absorbing alloy, and the like. However, by optimizing the area coated with the metal layer with respect to the entire area of the battery case in the range from 20% to 90%, the amount of discharge reserve could be maintained at approximately the initial value.

In the batteries of the present invention, the area in which the metal layer is formed is optimized by taking the condition for use (environment temperature, charge and discharge current value, charge and discharge depth, charge and discharge frequency, etc.) into account, and a battery having little deterioration can be obtained. In Examples, batteries made of a polymer alloy of PP and PPE, which is excellent in the strength, heat resistance, chemical resistance, and weldability, were used. However, even if batteries made of other resin materials are used, the same effects as those of the present invention can be obtained. Furthermore, in Examples, the wherein the battery case comprises outer wall members that define (a) a battery case main body having a hole and (b) a lid for closing the hole;
the battery case comprises a first portion made of a metal or a laminate of a metal and a resin, and a second portion made of a resin without metal present; and
an area of the outer wall members occupied by the first portion is 20% or more and 90% or less.

2. The nickel metal hydride storage battery according to claim 1, wherein the battery case main body comprises a resin case and a multilayered film formed on a part of the surface of the resin case; the multilayered film comprises a metal layer and two resin layers arranged in a manner in which the metal layer is interposed between the two resin layers; and a portion on which the multilayered film is formed is the first portion.

3. The nickel metal hydride storage battery according to claim 1, wherein the average thickness of the second portion is 0.7 mm or more and 2.5 mm or less.

4. The nickel metal hydride storage battery according to claim 1, wherein the hydrogen permeability coefficient at 40° C. of the resin forming the second portion is $2 \times 10^{-15}$ mol·m/m²·sec·Pa or more and $1 \times 10^{-14}$ mol·m/m²·sec·Pa or less.

5. The nickel metal hydride storage battery according to claim 1, wherein the average value of the hydrogen permeability at 40° C. of the second portion is $1.4\times10^{-18}$ mol/$m^2$·sec·Pa or more and $2.5\times10^{-17}$ mol/$m^2$·sec·Pa or less.

6. The nickel metal hydride storage battery according to claim 1, wherein the group of electrode plates comprise a negative electrode comprising a hydrogen absorbing alloy as a main component; and the hydrogen absorbing has an equilibrium hydrogen desorption pressure at 45° C. of 0.02 MPa or more and 0.1 MPa or less.

7. The nickel metal hydride storage battery according to claim 1, wherein the second portion comprises a polymer alloy of polypropylene and polyphenylene ether.

8. The nickel metal hydride storage battery according to claim 1, wherein the area of the first portion is 40% or more and 80% or less with respect to the area of the entire battery case.

9. The nickel metal hydride storage battery according to claim 8, wherein the area of the first portion is 50% or more and 70% or less with respect to the area of the entire battery case.

10. The nickel metal hydride storage battery according to claim 1, wherein the entire battery case main body is the first portion and the lid is the second portion.

11. The nickel metal hydride storage battery according to claim 1, wherein the battery case main body is formed of a Ni-plated steel sheet.

12. The nickel metal hydride storage battery according to claim 1, wherein the capacity of the nickel metal hydride storage battery is in the range from 4 Ah to 10 Ah.

13. The nickel metal hydride storage battery according to claim 1, wherein the area per cell of the nickel metal hydride storage battery is in the range from 100 $cm^2$ to 300 $cm^2$.

* * * * *